Dec. 15, 1959 B. R. GRAVES ET AL 2,916,914
MILES-PER-GALLON METER
Filed Nov. 14, 1956
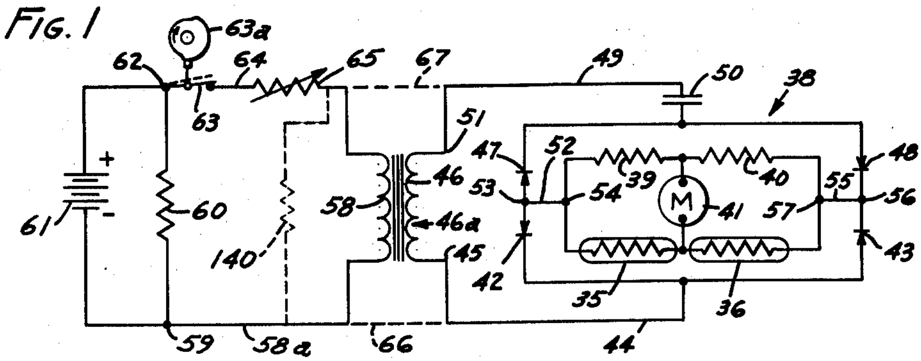
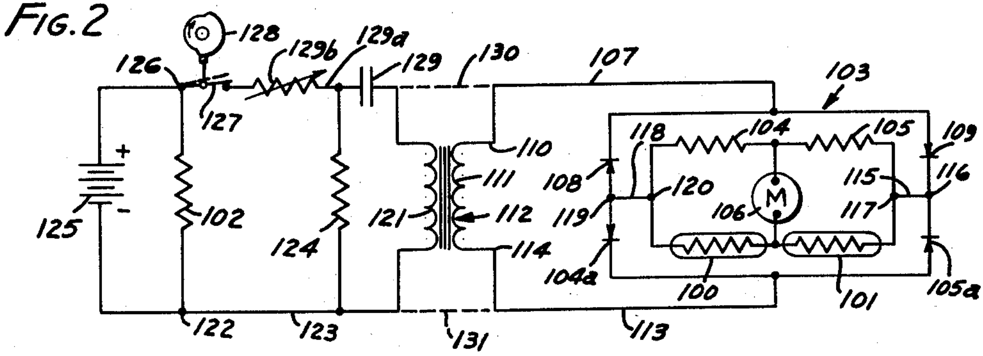
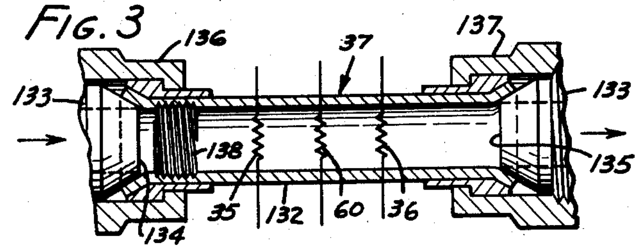
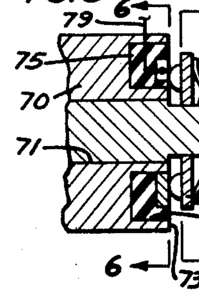
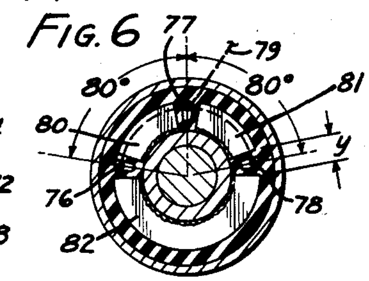
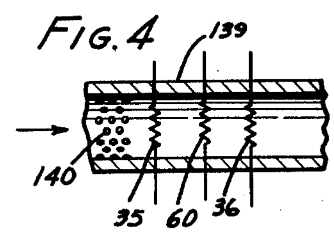
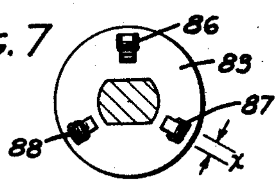
INVENTORS;
BARTON R. GRAVES,
JACK H. RUPE
BY D. Gordon Angus
ATTORNEY.

United States Patent Office 2,916,914

Patented Dec. 15, 1959

2,916,914

MILES-PER-GALLON METER

Barton R. Graves, Whittier, and Jack H. Rupe, Sunland, Calif., assignors of one-third to Russel O. Whiteman, Altadena, Calif.

Application November 14, 1956, Serial No. 622,164

5 Claims. (Cl. 73—114)

This invention relates to a miles-per-gallon meter.

This application is a continuation-in-part of Barton R. Graves and Jack H. Rupe patent application Serial No. 517,492, filed June 23, 1955, now abandoned, entitled "Miles-Per-Gallon Meter."

An object of this invention is to provide a compact, economical and simple device for measuring the efficiency of an engine in terms of miles traveled per gallon of fuel consumed, which device will be operative and accurate over a wide range of service conditions.

A related object is to provide a device which fits into a shorter length of fuel conduit than previously-known miles-per-gallon indicators.

This invention is carried out in a segment of a fuel line, which is preferably, although not necessarily, located between the fuel pump and the carburetor. In its broadest form this invention comprehends means for measuring the output of a circuit which circuit includes two temperature-sensitive means which are sensitive to a differential temperature existing between the stream points at which they are located, the differential temperature being inversely proportional to fuel flow.

Means are also provided for altering the source potential applied to said circuit in direct proportion to the speed of the vehicle, the output of the circuit thereby being directly proportional to the quotient, consisting of distance travelled per unit of fuel consumed.

According to the presently preferred form of the invention, a pair of temperature-sensitive means are disposed in a fuel line on opposite sides of a heater, one of said means being upstream, and the other downstream from said heater. Heat is supplied at a constant rate to the heater, so that the differential temperature between the two temperature-sensitive means is inversely proportional to the rate of fuel flow, the faster the rate of flow, the lower the temperature differential.

A feature of the invention resides in making the temperature-sensitive elements portions of a bridge circuit, and varying the potential on the bridge circuit in direct proportion to the speed of the automobile. Accordingly, the bridge output will be in direct proportion to the instantaneous value of the distance travelled per unit of fuel consumed.

The above and other features of this invention will be fully understood from the following detailed description, and the accompanying drawings, of which:

Fig. 1 is a circuit drawing of one embodiment of the invention;

Fig. 2 is a circuit drawing of the presently preferred embodiment of the invention;

Fig. 3 is a side view, partly in cutaway cross-section and schematic notation, showing a section of fuel line with certain elements of the invention installed therein;

Fig. 4 is a fragmentary view, partly in cutaway cross-section and partly in schematic notation, showing a modification of a section of fuel line suitable for use with the invention;

Fig. 5 is a cross-section of a commutator suitable for use in the circuits of Figs. 1 and 2; and Figs. 6 and 7 are cross-section views taken at lines 6—6 and 7—7, respectively, of Fig. 5.

One form of the invention is shown in Fig. 1, in which two thermistors 35, 36 are provided in a fuel line 37. Thermistors are temperature-sensitive elements whose electrical response (resistance) varies with temperature change. Upstream thermistor 35 and downstream thermistor 36 are spaced from each other, and fuel flow is in the direction indicated by the arrows in Fig. 3.

These thermistors form one arm of a bridge circuit 38 (see Fig. 1) in which resistors 39 and 40 form the other arm. A meter 41, such as a voltmeter or ammeter, interconnects the arms of the bridge between a point intermediate of the resistors 39 and 40 and at a point intermediate of the thermistors 35 and 36.

Branches of a lead 44 respectively connect with rectifiers 42 and 43, while lead 44 also connects to terminal 45 of the secondary winding 46 of a transformer 46*a*. Rectifiers 47 and 48 are connected to branches of a lead 49 which lead incorporates a condenser 50 and which also connects with terminal 51 of said secondary winding 46.

Lead 52 interconnects a terminal 53 located between rectifiers 42 and 47 to a terminal 54 which is disposed between thermistor 35 and resistor 39. Lead 55 interconnects a terminal 56 located between rectifiers 43 and 48 and a terminal 57 which is disposed between thermistor 36 and resistor 40. The directions of forward current flow through the rectifiers are indicated in the drawing according to conventional notation, the point of the arrow indicating the direction of forward current flow.

The transformer 46*a* has a primary winding 58 which is connected to a terminal 59 by a lead 58. A heater 60 is disposed in the fuel line 35 between the thermistors so that thermistor 35 is upstream therefrom, and thermistor 36 is downstream therefrom, and is conneced to terminal 59. A battery 61 is also connected to terminal 59. The battery and heater are joined to another terminal 62 so that they are in parallel circuit relationship between the terminals 59 and 62.

A switch 63, which may be opened and closed by commutator or cam means 63*a*, is connected to terminal 62. The cam means may be connected to any desired part of the vehicle whose movement is proportional to the speed of the vehicle, such as the speedometer cable, or the wheels, for example. The switch is thereby opened and closed at a frequency proportional to the velocity of the vehicle. The commutator is connected by a lead 64 to the primary winding of the transformer, and this lead 64 can include a potentiometer-type resistor 65.

An optional circuit configuration is indicated by dotted lines 66 and 67 in Fig. 1. Lines 66 and 67 represent direct-connecting leads which may interconnect leads 58*a* and 44, and leads 64 and 49 if it is desired to eliminate the transformer from the circuit. If the voltage supplied by the automobiles electrical system is high enough, the step-up transformer 46*a* can be eliminated.

Fig. 2 illustrates the presently preferred form of the invention in which two thermistors 100 and 101 are provided in a fuel line such as fuel line 37. The thermistor 100 is upstream and thermistor 101 is downstream from a heater 102. These thermistors form one arm of a bridge circuit 103 in which resistors 104 and 105 form the other arm. A meter 106, such as an ammeter or a voltmeter, interconnects the arms of the bridge between a point intermediate of the resistors 104 and 105 and a point intermediate of thermistors 100 and 101. Branches of a lead 107 respectively connect with rectifiers 108 and 109, while lead 107 also connects to terminal 110 of the secondary winding 111 of a step-up transformer 112. Rectifiers 104*a* and 105*a* are connected in branches of a lead 113, which lead connects with a terminal 114 of the said secondary winding 111.

Lead 115 interconnects a terminal 116 located between rectifiers 105 and 109 to a terminal 117 which is disposed between thermistor 101 and resistor 105. Lead 118 interconnects a terminal 119 located between rectifiers 104 and 108 and a terminal 120 which is disposed between thermistor 100 and resistor 104.

The transformer 112 has a primary winding 121 which is connected to a terminal 122 by lead 123. The heater is disposed in the fuel line between the thermistors so that thermistor 100 is upstream therefrom and resistor 101 is downstream therefrom, and is connected between terminals 122 and 126. A battery 125 is also connected between terminals 122 and 126, so that the battery and heater are connected in parallel circuit relationship with each other.

A switch 127, which may be opened and closed by commutator or cam means 128 is connected to terminal 126. The cam means 128 are connected to the vehicle in the same manner as the cam means 63*a* of Fig. 1. A condenser 129 is connected between the switch 127 and the primary winding of the transformer 112 by a lead 129*a*. A resistor 124 is connected between leads 129*a* and 123. A rheostat 129*b* is incorporated in lead 129*a*, and resistor 124. Resistor 124 connects to lead 129*a* between the rheostat 129*b* and the condenser 129. Resistor 124 is therefore connected across primary winding 121.

Dotted lines 130 and 131 show an alternate connection which may be used in the event that the potential supplied by the automobile electrical system is sufficiently high that the services of a step-up transformer are not required. If the connections 130 and 131 are used, resistor 124 and transformer 112 will be removed.

Examples of suitable values for the device shown in Fig. 2 are:

| | | |
|---|---|---|
| Heater **102** | ohms | 6 |
| Resistor **124** | do | 15 |
| Rheostat **129***b* | do | 0–50 |
| Condenser **129** | microfarads | 10 |
| Transformer **112** ratio | about | 4.5:1 |
| Thermistors **100, 101** | ohms | 1000 |
| Resistors **104, 105** | do | 150 |

In Fig. 3 there is particularly shown a section of fuel line 37 suitable for use of the miles-per-gallon indicator of either of the above embodiments. This example is shown with the temperature sensitive elements 35 and 36 of Fig. 2, and the heater 60 of Fig. 1, although it could as well have shown the thermistors 100 and 101 and the heater 102 of Fig. 2. This fuel line section has a tubular portion 132 within which the temperature sensitive electrical elements and the heater are disposed in the order shown, with the heater between the two temperature sensitive elements.

The tube 132 may be incorporated into the fuel line 133 of the automobile by cutting out a small section thereof and joining the two ends 134 and 135 thereof to the tube 132 by means of standard tubing couplings 136 and 137. It is a significant requirement in a device of this type that the temperature of the fuel flowing past the electrical elements be fairly uniform across section of the fluid flow. For this reason internal threads 138 or other types of discontinuity are formed in at least the upstream portion of the tube 132. This provides sufficient turbulence in the stream so that the temperature-sensitive elements (the thermistors) and the heater have an even temperature across their physical length.

Fig. 4 shows a section of tubing 139 which could be substituted for the tube 132 in the device of Fig. 3. The surface discontinuities on the inside of the tube for making the flow more turbulent, and thereby giving a uniform temperature across the flow section comprises glass beads 140 cemented to the inside walls of the tubing. It will be evident that many other means besides those shown can be provided for making a turbulent flow but that these appear to be the simplest.

In Figs. 5–7 inclusive there is shown another embodiment of commutator assembly for producing pulses with a frequency proportional to the velocity of the vehicle. A commutator mount 70 which is of some conducting material has a shaft passage 71 therethrough to accommodate ar otating commutator shaft 72 which is driven at a rate proportional to vehicle velocity. In face 73 of the commutator mount there is a groove 74 which is lined with an insulating material 75. Within this insulating material 75 and facing the end of the commutator mount there are disposed six conductive inserts. Three conductive "hot" inserts 76, 77, and 78 are interconnected to a lead 79 which passes through the conductive mount. Said three "hot" inserts are angularly displaced 80° from each other, and each is of a width "Y."

Inserts 80 and 81 are disposed within the 80° angle enclosed by inserts 76 and 77 and between inserts 77 and 78, respectively. While inserts 76, 77 and 78 are completely insulated from the commutator mount, inserts 80 and 81 are tack welded to the center portion. Another insert 82 has an arcuate length of approximately 180° and is disposed in the angle between inserts 76 and 78. Insert 82 is also tack-welded to the conductor mount. It will therefore be seen that "hot" inserts 76, 77 and 78 can be connected to a source of voltage through lead 79, and are insulated from the conductor mount, while inserts 80, 81 and 82 are conductively affixed to said mount.

A commutator plate 83 is fixed to the commutator shaft 72 by means such as key slot 84 on said shaft. A spring 85 forces the commutator plate 83 toward the inserts on the face of the commutator mount. Commutators bars 86, 87 and 88, are spaced 120° apart on the face of said commutator plate and are tack welded thereto. Each of these commutator bars has a width "X." These commutator bars are rotated by the commutator shaft so as to make sequential contact with the various inserts on the face of the commutator mount.

This commutator assembly may be directly substituted for the commutator shown in Fig. 1 or for commutator 128 shown in Fig. 2, the lead 79 being attached to terminals 62 or 126, respectively, and the conductive mount connected to lead 64 or 129*a*, respectively.

In order to produce nine pulses per revolution of the rotor shaft, it has been found advantageous to make a commutator assembly withd imensions $X$=.040 inch, $Y$=.053 inch, and diameter of commutator bars at contact point of inserts 76, 77 and 78 approximately .0625 inch, so that about 70% of dimension "X" contributes to a given pulse period. The commutator bars are conveniently spaced 120° apart.

The operation of the embodiment of Fig. 1 will now be described. In this system, heat is added to the fuel stream by the heater 60 at a constant rate, while the velocity factor of the quotient (miles per gallon) is provided for by varying the source voltage for the bridge circuit.

According to this embodiment, battery 61 provides a steady current in heater 60 and the battery is also interconnected to the switch 63 which is operated mechanically so as to make and break the circuit at a rate proportional to the velocity of the automobile. This commutator switch is in turn connected to an adjustable resistor, and provides a pulsed current to the primary winding 57 of the transformer. The transformer provides a stepped up voltage, say 12 volts, to a condenser 50. The resistor 65 and the condenser 60 together act to differentiate the pulse produced by commutator so that the current-time area of the pulse is constant, regardless of the frequency of the pulses. Therefore the rectified voltage across the bridge circuit will be proportional to the number of pulses, which is proportional to the velocity of the vehicle. The thermistors 36 and 37 are temperature sensitive elements whose resistance varies markedly with the temperature. Therefore the meter reading on the output indicator 41 is proportional to the difference in temperature of thermistors 36 and 37 and also to the velocity of the vehicle.

If a sufficiently high voltage source is available on the vehicle, the transformer can be dispensed with, inasmuch as its principal function in the circuit is to provide an increased voltage so as to increase the sensitivity and accuracy of the indicated output. Then leads 66 and 67 will be used as shown in Fig. 1, along with a resistor 140 across leads 58 and 64, and the transformer will be omitted.

It will be appreciated that a high fuel flow past the constant-heating-rate heater will have a lower differential temperature than a lower flow rate. Also it will be appreciated that the greater the frequency of rotation of the commutator, the higher will be the output indicator reading, since its operating voltage will be increased. Therefore the output indicator in Fig. 1 reads the quotient, miles per gallon.

The operation of the commutator device of Figs. 5–7 inclusive will be evident from the examination of the drawings. This device may be directly substituted for the commutator assembly 63*a* in the circuit of Fig. 1, or for the commutator assembly 128 in the circuit of Fig. 2. The object of this commutator assembly is to make and break the circuit in which it is placed. Current is applied to inserts 76, 77, and 78 through lead 79, and as the commutator shaft is turned, the commutator bars 86, 87, 88, make intermittent contact with these "hot" inserts. Current flows through said commutator bars to the commutator plate and to another of said bars to one of the inserts 80, 81 or 82. Some rotor bar is always in contact with one of the latter three inserts, while there are positions of the commutator plate at which no commutator bars is in contact with one of the "hot" inserts. Current can flow when contact is made, from one of the hot inserts through the commutator plate into one of inserts 80, 81 or 82 and out through the commutator mount to ground so as to complete the circuit at that time. The circuit is broken when no commutator bar is in contact with one of the "hot" inserts. Resistor 124 serves to discharge the condenser when the commutator is in the open ("break") position, in the embodiments of Fig. 2.

The operation of the commutator assemblies to provide an electrical quantity which is substantially proportional to velocity is deducible from well-known electrical principles.

In charging a series capacitance-resistance circuit, the charging current behaves according to the relationship $$i=\left(\frac{E}{R}\right)\epsilon^{-\frac{t}{RC}}$$

when E equals the applied voltage and $\epsilon$ is the naperian logarithm base.

The voltage across the resistor in the circuit of Fig. 2, for example, which is in this case the resistance of the transformer in series with the reflected resistance of the rectifier bridge load, is a function of time, and since eventually the charge $q$ on the capacitor is equal to CE, $$q=CE, \text{ or } E=\frac{q}{c}$$

and since the equation for the voltage across the resistor may also be written as a function of time, thus:

$$e(t)=Ri+\frac{q}{c}$$

thus, by making R and C small, R$i$ is made much smaller than $$\frac{q}{c}$$

and therefore:

$$i^0=c\frac{dc(t)}{dt}$$

Thus the voltage across the resistor is approximately $$e_R=Ri\alpha RC\frac{de(t)}{dt}$$

This is to say that $e_R$, the voltage across the resistor, is approximately proportional to the derivative of the applied voltage. Where $$\frac{q}{c}\gg Ri, \text{ and } \frac{q}{Rc}\gg\frac{dq}{dt}$$

It is therefore necessary for RC to be made small. In this invention, a time constant $RC=.01T$ has been found to be satisfactory, where T is equal to the total lapse of time from peak to peak of successive pulses.

From the above it can be seen that the average current produced in the resistance of the circuit itself is proportional to the number of pulses per unit time, or, in this application, to revolutions per minute. In particular, the voltage to the bridge circuit in Figs. 1 and 2 is similarly proportional. Thus, the average current $i_a$ is as follows:

$$i_a=\left(\frac{E}{R}\right)\int_0^t\epsilon^{-\frac{t}{CR}}dt$$

$$\text{where } t=\frac{T}{2}$$

In this manner, electrical response is provided to the measuring means which is proportional to the velocity of the vehicle. This feature of utilizing electrical elements producing a response approximately proportional to the derivative of the applied voltage, aids in the obtaining the accurate response provided in this simple device.

The embodiment of Fig. 2 operates in substantially the same fashion. It will be observed that a condenser 129 has been put in the circuit of the primary winding of the transformer instead of in the secondary winding as in the circuit of Fig. 1. It has been found that placing this condenser in the circuit of the primary winding, and by connecting resistor 124 across the primary winding, better differentiation is provided. Otherwise the operation of the two embodiments is substantially the same. Transformer 112 can be omitted, if the voltage from battery 125 is sufficiently high, by using leads 130 and 131 where shown, and removing the transformer.

There is thus provided a simple and accurate device which can be installed in a short segment of fuel line. In fact about ⅝ inch is a sufficient length, and this lowers errors due to radiation of heat, or the picking up of heat from the surrounds, and diminishes or eliminates the need for heat insulation.

It will be further appreciated that, contrary to other known efficiency indicators, there is no recirculation within the indicator itself. Such recirculation has occurred in some devices where division of the fluid stream has been utilized to indicate velocity. The recirculation of the fluid causes the effect of the velocity factor to be distorted, and an error in reading results. This invention has but a single conduit, and recirculation cannot occur within the device.

This invention is not to be restricted to the embodiments shown in the drawings and described in the description, which are given by way of example, and not of limitation, but only in accordance with the scope of the appended claims.

We claim:

1. A miles-per-gallon indicator, adapted to be connected to the fuel line of a vehicle through which fuel flows, comprising: a pair of thermistors spaced from each other inside the fuel line, one of said thermistors being upstream of the other thermistor, a heater disposed in said fuel line between said thermistors, said heater being adapted to supply heat at a constant number of calories per unit time to the fuel flowing through the fuel line, the fuel line being unbranched and continuous between said thermistors, a bridge circuit having two arms, a first of said arms including said two thermistors, two resistors in the other of said arms, a meter interconnecting said arms at a point between the resistors and at a point between the thermistors, the two arms being connected at their ends, rectifying means connected to said ends for supplying a rectified voltage to said ends, and means for supplying said rectified voltage from a standard voltage source at a value proportional to the speed of the vehicle, comprising a condenser in series connection with said bridge and source and a resistor connected in parallel with said bridge and source, the condenser being disposed between the bridge and the resistor, and means for intermittently interrupting current from said source to said last-named means at a rate proportional to vehicle speed.

2. A miles-per-gallon indicator according to claim 1 in which the surface of the fuel line adjacent said thermistors and heater is irregular, whereby fluid flows turbulently over the heater and thermistors.

3. A miles-per-gallon indicator according to claim 1 in which a transformer having a pair of windings is provided, a first of said windings being connected to said rectifying means, and the second of said windings being serially connected to the condenser and parallel connected to the resistor.

4. A miles-per-gallon indicator according to claim 3 in which the surface of the fuel line adjacent said thermistors and heater is irregular, whereby fluid flows turbulently over the heater and thermistors.

5. A miles-per-gallon indicator for measuring the quotient of speed of a vehicle divided by its fuel consumption, said fuel flowing through a fuel line, comprising: a pair of thermistors spaced from each other inside the fuel line; a heater disposed in said fuel line between said thermistors so that one thermistor is upstream from the heater and the other thermistor is downstream from the heater, the fuel line being continuous and unbranched between the thermistors; means for providing said heater with power at a constant rate; a bridge circuit incorporating the two thermistors as one arm thereof; an indicator means in said bridge circuit for measuring the electrical response of said thermistors; and means connected to the bridge circuit for varying the potential applied to said bridge circuit in proportion to the velocity of the vehicle comprising a circuit containing a source of electric potential, a condenser, a resistor, and means for making and breaking said circuit with a frequency proportional to the velocity of the vehicle, said means for making and breaking said circuit comprising a commutator which includes the following elements: a commutator mount, three first conductive "hot" inserts in said mount insulated from said mount and interconnected with a source of potential, and three second conductive inserts disposed between said "hot" inserts, said inserts being disposed in a circular pattern with the "hot" inserts being disposed substantially 80° apart, and the other inserts extending substantially the total distance between said "hot" inserts, said second inserts being conductively interconnected with the said commutator mount, a rotatable commutator shaft, a commutator plate mounted to and turned by said shaft, said plate having commutator bars on its surface for sequentially contacting the insert, said bars being disposed substantially 120° apart, said bars, plate, and shaft, being conductively connected with said commutator mount.

References Cited in the file of this patent

UNITED STATES PATENTS

| | | |
|---|---|---|
| 2,176,502 | Kurth | Oct. 17, 1939 |
| 2,250,125 | Chisholm | July 22, 1941 |
| 2,304,822 | Harrison et al. | Dec. 15, 1942 |
| 2,454,393 | Leonard | Nov. 23, 1948 |